(12) United States Patent
Wood et al.

(10) Patent No.: US 10,309,163 B2
(45) Date of Patent: Jun. 4, 2019

(54) PIPE COUPLING

(71) Applicant: Meta Downhole Limited, Aberdeen (GB)

(72) Inventors: Peter Wood, Aberdeen (GB); Daniel O'Brien, Stonehaven (GB)

(73) Assignee: MORPH PACKERS LIMITED, Aberdeen (GB)

( * ) Notice: Subject to any disclaimer, the term of this patent is extended or adjusted under 35 U.S.C. 154(b) by 340 days.

(21) Appl. No.: 14/891,359

(22) PCT Filed: May 16, 2014

(86) PCT No.: PCT/GB2014/051498
§ 371 (c)(1),
(2) Date: Nov. 15, 2015

(87) PCT Pub. No.: WO2014/184567
PCT Pub. Date: Nov. 20, 2014

(65) Prior Publication Data
US 2016/0084015 A1    Mar. 24, 2016

(30) Foreign Application Priority Data

May 17, 2013   (GB) .................................. 1308887.7

(51) Int. Cl.
*E21B 17/046* (2006.01)
*E21B 17/042* (2006.01)
(Continued)

(52) U.S. Cl.
CPC .......... *E21B 17/046* (2013.01); *E21B 17/042* (2013.01); *E21B 17/043* (2013.01); *F16L 13/141* (2013.01); *F16L 13/147* (2013.01)

(58) Field of Classification Search
CPC ....... F16L 15/08; F16L 13/147; F16L 13/141; E21B 17/046; E21B 17/043; E21B 17/042
(Continued)

(56) References Cited

U.S. PATENT DOCUMENTS

| | | | |
|---|---|---|---|
| 1,915,008 A | 6/1933 | Youker | |
| 4,298,221 A * | 11/1981 | McGugan | ............. E21B 17/046 285/332.4 X |

(Continued)

FOREIGN PATENT DOCUMENTS

| | | |
|---|---|---|
| DE | 880410 | 6/1953 |
| DE | 20 2004 016 655 U1 | 1/2005 |

(Continued)

OTHER PUBLICATIONS

Intellectual Property Office (GB) Search Report for GB 1308887.7, dated Nov. 7, 2013, entire document.

(Continued)

*Primary Examiner* — Greg Binda
*Assistant Examiner* — Zachary T Dragicevich
(74) *Attorney, Agent, or Firm* — Law Office of Jesse D. Lambert, LLC

(57) ABSTRACT

A coupling system between tubulars such as tubing, pipes, casing and liner for location in a well bore in which profiled sections (46, 50) on the tubulars (12, 14) are connected using a radially applied force to form a metal to metal sealed connection. Embodiments are provided in which the profiled sections are grooved and/or tapered, additional profiles are provided to prevent relative rotation of the tubulars, the radial force is applied inwardly, outwardly or in both directions, and a connector is used as an additional tubular member to form the coupling.

13 Claims, 4 Drawing Sheets

(51) Int. Cl.
*E21B 17/043* (2006.01)
*F16L 13/14* (2006.01)

(58) Field of Classification Search
USPC ............... 285/332, 332.1, 332.4, 334, 390
See application file for complete search history.

(56) References Cited

U.S. PATENT DOCUMENTS

| | | | |
|---|---|---|---|
| 4,561,683 A * | 12/1985 | Lumsden | ............ E21B 17/046 |
| 4,601,491 A | 7/1986 | Bell, Jr. et al. | |
| 4,779,902 A * | 10/1988 | Lee | ..................... F16L 47/00 |
| 4,830,408 A * | 5/1989 | Reimert | ............ E21B 17/046 |
| 4,907,828 A * | 3/1990 | Chang | ................. F16L 15/08 |
| 5,066,052 A | 11/1991 | Read | |
| 5,338,074 A | 8/1994 | Barringer et al. | |
| 5,498,035 A | 3/1996 | Blose et al. | |
| 6,231,086 B1 * | 5/2001 | Tierling | ................ F16L 13/08 |
| 9,222,607 B2 * | 12/2015 | Williams | |
| 2004/0069498 A1 | 4/2004 | Simpson et al. | |
| 2006/0273586 A1 * | 12/2006 | Reynolds, Jr. | ............... 285/390 |
| 2008/0231042 A1 | 9/2008 | Brayman et al. | |
| 2012/0235404 A1 * | 9/2012 | Coeffe | ................ E21B 17/043 |
| | | | 285/332 |

FOREIGN PATENT DOCUMENTS

| | | |
|---|---|---|
| GB | 2485047 A | 5/2012 |
| WO | WO 01/72464 A1 | 10/2001 |
| WO | WO 03/089754 A1 | 10/2003 |

OTHER PUBLICATIONS

EPO as International Search Authority, International Search and Written Opinion for PCT/GB2014/051498, dated Sep. 12, 2014, entire document.

* cited by examiner

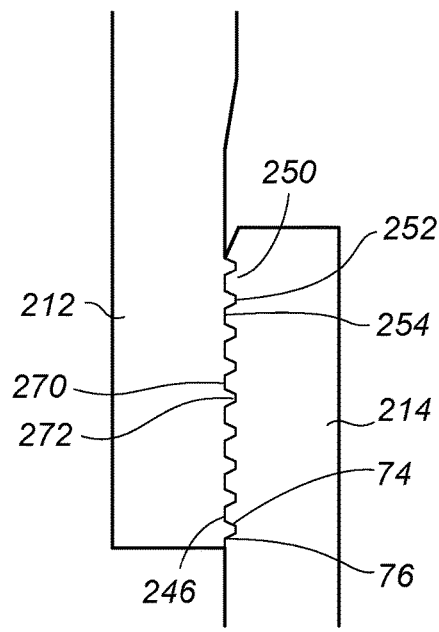
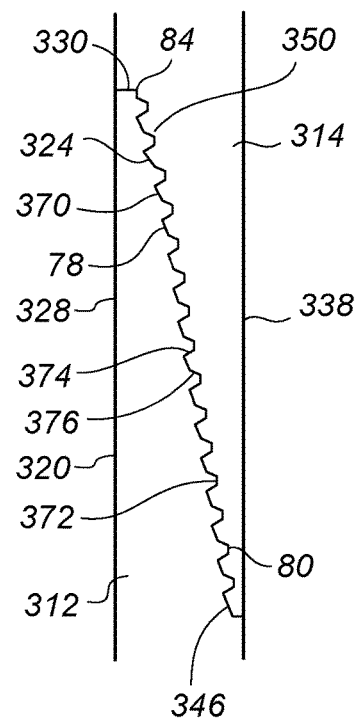
Fig. 4        Fig. 5
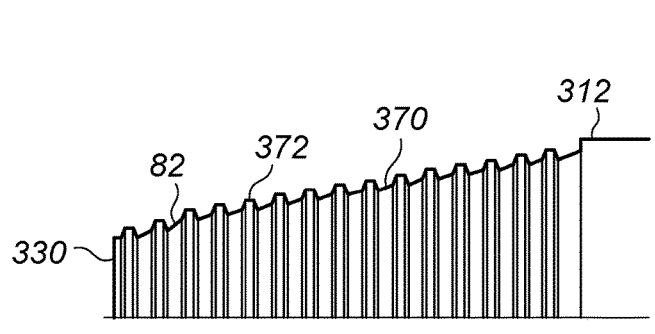
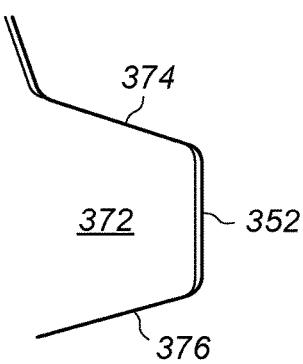
Fig. 6        Fig. 7

PIPE COUPLING

The present invention relates to a coupling system between tubulars such as tubing, pipes, casing and liner for location in a well bore. In particular, though not exclusively, the invention relates to a coupling system in which profiled sections on the tubulars are connected using a radially applied force to form a metal to metal sealed connection.

In the exploration and production of oil and gas wells, tubulars in the form of tubing, pipe, casing and liner are run into the well bore. As the depth of each well bore can be hundreds of meters, the tubulars are manufactured in fixed lengths and then they require to be joined together. A typical method of joining tubulars together is to use a screw threaded connection to form a tubular string for insertion in a well bore. In order to achieve this type of connection each tubular member is manufactured with a box section at a first end and a pin section at the opposing end having respective male and female screw threads. The outer surface at the ends of the tubulars are keyed to allow one tubular to be held in place while the second tubular is turned so as to mate with the first and make-up the threaded connection. A known disadvantage of such a connection is that if the tubular string becomes stuck in the well bore, the string cannot be rotated counter to the direction of the screw thread as the connection may come apart. Standard screw threaded connections may also not provide a reliable seal between the inside of the tubulars and the outside of the tubulars at the connection as a fluid path can exist along the helical screw thread. Additionally the threads can be prone to make up problems, require the use of dope (lubricant and sealant) and can have a complex supply chain.

To overcome these disadvantages, the present applicants have proposed a pipe joint connector. This is illustrated in FIG. 1(a). The connector A comprises a substantially cylindrical body B with a bore C therethrough for location over a first end D of a first tubular E and a first end F of a second tubular G, the body B having an outer surface with a substantial uniform diameter and a profiled inner surface H wherein a plurality of circumferential grooves J extend entirely around the inner surface with at least one circumferential groove being located towards each end of the connector. A ledge K protrudes into the bore C for locating the respective ends D,F in the connector. A force is applied radially outwards or inwards upon the ends to cause the ends to deform into the grooves and form a metal to metal seal, see FIG. 1(b).

A disadvantage in this coupling arrangement is in the acceptable wall thickness of the connector. As the outer diameter of the connector must stay within reasonable limits (10.542" is the OD of a standard coupling), out of necessity the connector becomes thin-walled (i.e. pipe has an OD of 9.625" as against connector of 10.542") and the grooves (0.2" depth) further reduce the wall thickness at their locations. Consequently, when a radial force is applied the pipe wall does not deform fully into the grooves while the connector itself yields considerably and is at risk of becoming unstable.

It is therefore an object of at least one embodiment of the present invention to provide a coupling system between tubulars which mitigates at least some of the disadvantages of the prior art.

According to a first aspect of the present invention there is provided a coupling system between first and second tubular members comprising: a first tubular member having a first end which includes a first profiled section extending circumferentially and continuously around an outer surface; a second tubular member having a first end which includes a second profiled section extending circumferentially and continuously around an inner surface; the first end of the first tubular member being inserted within the first end of the second tubular member so that the profiled sections are coaxial and by application of a force creating a metal to metal seal between the tubular members at the profiled sections.

In this way, the tubular members can be coupled directly together without the requirement of an intermediary connector if desired. By creating profiles on both ends of the tubular members the tension/compression is spread more evenly across the joint and the coupling is stable.

Preferably the first and second tubular members have the same outer diameter and inner diameter. In this way, a coupling can be made-up without requiring box sections at the coupling point.

Preferably the force is applied radially outwardly. In this way, a force is applied to an inner surface of the first tubular member to cause it to expand and contact the inner surface of the second tubular. More preferably, the force is applied radially inwards. In this way, the force is applied to an outer surface of the second tubular to cause it to move radially inwards and contact the inner surface of the first tubular. In this way, an interference is created between the first and second profiled sections on each tubular member.

By applying a radial force to make-up the coupling, the tubular members do not have to be turned as would be required for a screw-thread.

Preferably, the first profiled section comprises one or more circumferential grooves formed on the outer surface of the first end. Preferably also, the second profiled section comprises one or more circumferential grooves formed on the inner surface of the first end. More preferably, a continuous annular rim is formed between each pair of grooves.

In an embodiment, grooves are formed on the first and second profiled sections. More preferably, each groove on the first and second profiled section is arranged to mate with a rim on the opposing second and first profiled section, respectively. In this way, the first profiled section is a reverse of the second profiled section so that the sections perfectly mate causing an interference fit when the force is applied. When a plurality of grooves are present, the coupling may be considered as a meshed teeth arrangement.

Preferably, the first profiled section is tapered. In this way, the thickness of the tubular wall reduces across the first end being narrowest at a distal end. Preferably also, the second profiled section is tapered. In this way, the thickness of the tubular wall reduces across the first end being narrowest at a distal end. Tapering the ends reduces the required outer diameter of the coupling while maintaining the diameter of the inner through bore.

Preferably, the first tubular member includes a third profiled section at an end face and the second tubular member includes a fourth profiled section at an end face wherein the third and fourth profiled sections mate to prevent relative rotation of the tubular members. In an embodiment, the third profiled section comprises at least one lug on the end face and the fourth profiled section comprises at least one notch, each notch being sized to receive a lug when the force is applied. Alternatively, the fourth profiled section comprises at least one lug on the end surface and the third profiled section comprises at least one notch. By keying the facing ends of the tubular members, relative rotation of the tubular members is prevented.

Preferably, the second tubular member has an increased outer diameter at the first end. This provides a gradient surface against which a cone may act to create the force. More preferably, once coupling is made, the outer diameter at the first end is the same as an outer diameter of the second tubular member.

In an embodiment, the second tubular member may be a connector. In this way, a connector can be used to make up two coupling systems to join a first and third tubular together via the connector. Preferably the first and third tubulars each have a profiled section on an outer surface at a first end and the connector has a profiled section on an inner surface at each end of a substantially cylindrical body. In this way, connectors can be of a shorter length than the tubulars which they are coupling together, making it easier to machine on an inner surface thereof with the longer tubulars only requiring to be machined on the outer surface and end face which is accessible.

Preferably, the connector has an inner surface which includes a ledge protruding into the bore. In this way, the tubular members are located in a fixed position in the connector by abutting the ledge. More preferably, the ledge includes the fourth profiled section so that the tubulars and the connector cannot rotate relative to each other.

Further features are embodied in the description.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the accompanying drawings of which:

FIGS. 1(a) and 1(b) are schematic illustrations of a joint between two tubular members according to the prior art;

FIG. 4 is a schematic illustration of a coupling system between two tubular members according to a third embodiment of the present invention;

FIG. 5 is a schematic illustration of a coupling system between two tubular members according to a fourth embodiment of the present invention;

FIG. 6 is a side view of a first profiled section of the tubular member of FIG. 5;

FIG. 7 is a schematic illustration of a portion of first and second profiled sections of the first and second tubular members, respectively, of FIG. 5.

Figure 2:
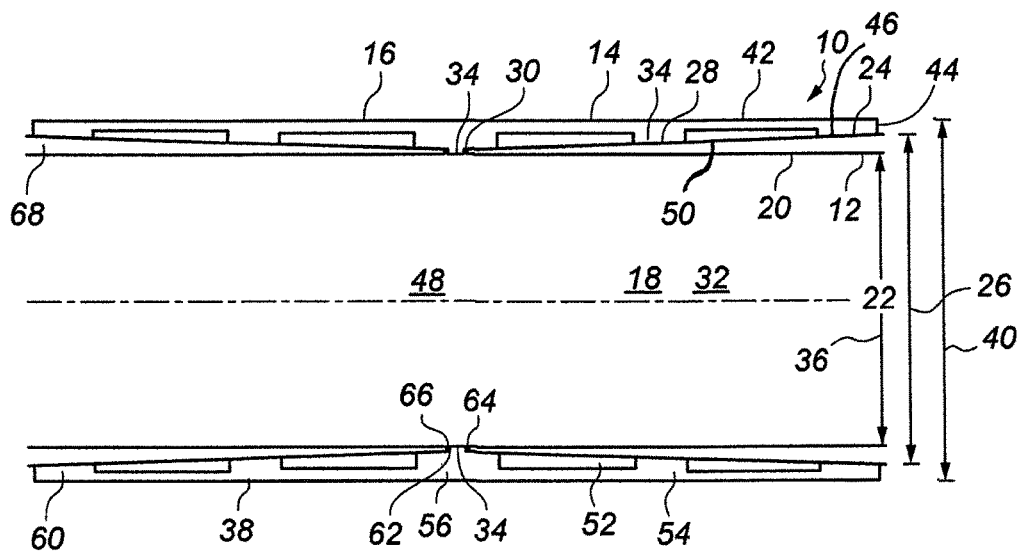
FIG. 2 is a schematic illustration of a coupling system between tubular members according to a first embodiment of the present invention.

Referring initially to FIG. 2 of the drawings there is provided a coupling system, generally indicated by reference numeral 10, providing a connection between a first tubular member 12 and a second tubular member 14 according to an embodiment of the present invention.

The first tubular member 12 has a substantially cylindrical body having a bore 18 therethough providing an inner surface 20 with a first diameter 22 and an outer surface 24 with a second diameter 26 along a majority of it's length (not shown). The first tubular member 12 is of metal construction and has dimensions typical of tubulars found in the oil and gas industry as used in tubing strings, casings and liners. The first tubular member 12 has a first end 28 with an annular end face 30 which is substantially perpendicular to the longitudinal axis of the bore 18.

In this embodiment, the second tubular member 14 is a connector 16 being a metal sleeve. The coupling system 10 will be described with reference to a first end 42 of the connector 16. The second tubular member 14 has a substantially cylindrical body having a bore 32 therethough providing an inner surface 34 with a first diameter 36 and an outer surface 38 with a second diameter 40. The first diameter 36 is the narrowest section of the second tubular member 14. The second tubular member 14 has a first end 42 with an annular end face 44 which is substantially perpendicular to the longitudinal axis of the bore 32.

On the outer surface 24 of the first end 28 of the first tubular member 12 there is a first profiled section 46. Profiled section 46 is a shape machined into the outer surface 24. The shape is entirely circumferential in that, a cross-sectional view as shown in FIG. 2, would be identical for every cross-section around the tubular 12. Profiled section 46 is tapered. In this way the outer surface 24 reduces from the outer diameter 26 towards the inner diameter 22, leaving a wall thickness of the annular end face 30 at the distal end 48. The taper is gradual and thus easily machined on the end 28 of the tubular 12.

On the inner surface 34 of the first end 42 of the second tubular member 14 there is a second profiled section 50. Profiled section 50 is a shape machined into the inner surface 34. The shape is entirely circumferential in that, a cross-sectional view as shown in FIG. 2, would be identical for every cross-section around the tubular 14. Profiled section 46 provides circumferential grooves 52. The grooves 52 are rectangular cut-outs forming a complete annular ring. The grooves 52 are equidistantly spaced with a rim 54 located between the grooves 52. The rim 54 may be considered as a circumferential band, bead or protrusion facing the bore 32. While two grooves 52 are shown in FIG. 2, there may be any number of grooves 52. In this embodiment, a width of each groove 52 is greater than a corresponding width of each rim 54 to make the arrangement space efficient, though any relationship can be used. The profiled section 50 is tapered. In this way the inner diameter increases from the diameter 36 at the end face 44 towards the outer diameter 40, leaving a wall thickness of the annular end face 44 at the distal end. Preferably the profiled sections 46,50 have the same angle of taper, but oppositely arranged.

In use, the first end 28 of the first tubular member 12 is inserted into the first end 42 of the second tubular member 14 until the profiled sections 46,50 are coaxially arranged on the bore 18. This is the arrangement shown in FIG. 2. A metal to metal seal is created between the profiled sections 46,50 at the first end 28 of the first tubular member 12 and the first end 42 of the second tubular member 14. This is achieved by applying force to the inner surface 20 at the first end 28 of the first tubular member 12.

If desired, although probably not necessary if the seal is made up outside the well bore, the grooves 52 may be filled with a compliant material being a sealant, foam or gel which may be compressed when the tubular member 12 bends into the grooves 52 as will be described hereinafter.

The seal may be created by use of a hydraulic tool (not shown). A detailed description of the operation of such a hydraulic tool is described in GB2398312 in relation to the packer tool 112 shown in FIG. 27 with suitable modifications thereto, where the seal means 92 could be provided by suitably modified seal assemblies 214, 215 of GB2398312, the disclosure of which is incorporated herein by reference. The entire disclosure of GB2398312 is incorporated herein by reference.

The tool is inserted into the tubulars 12,14 and located within the bore 18 of the first tubular member 12. Elastomeric seals are arranged on the tool to straddle the grooves 52 and lie over the inner surface 20 of the tubular member 12. When in position the elastomeric seals are energised so that they expand radially outwardly and create a seal between the outer surface of the tool body and the inner surface 20 of the first tubular member 12. With the seals energised a chamber is created which is bounded by the outer surface of the tool, the inner surface 20 and the elastomeric seals. Hydraulic fluid is then pumped through the tool body so that it exits a port and enters the chamber. Once the chamber is filled, continued pumping forces the end 28 of the tubular member 12 to move radially outwardly by the use of fluid pressure acting directly on the inner surface 20 between the elastomeric seals. Sufficient hydraulic fluid pressure is applied to move the end 28 of the tubular member 12 radially outwards and cause the tubular member 12 to morph itself onto the inner surface 50 of the first end 42 of the second tubular member 14. During the morphing process, the tubular member 12 will undergo elastic expansion filling or at least partially filling the grooves 52. Continued expansion will cause the tubular member 12 to undergo plastic deformation. Sufficient pressure may be applied to cause the first end 46 of the second tubular member 14 to undergo elastic deformation to expand by a small percentage as contact is made. Pumping of hydraulic fluid is then stopped. As the pressure is released the end 46 of the second tubular member 14 returns to its original dimensions and creates a seal against the deformed end 28 of the tubular member 12. During the morphing process, the inner 20 surface of the end 28 of the first tubular member 12 will take up the shape of the inner surface 50 of the first end 46 of the second tubular member 14. The material within the grooves 52 can improve the seal by compressing between the joint during morphing thereby preventing air pockets remaining at the grooves 52. A metal to metal seal is preferentially achieved between the first tubular member 12 and the second tubular member 14 at the edges of the grooves 52 as the tubular member 12 bends around when it is morphed into the grooves 52. At each groove 52 there are two points for a seal, so for several grooves there are multiple sealing points. The grooves 52 provide for vertical loading when the tubular members 12,14 are arranged for insertion in the well bore.

With a joint between the first tubular member 12 and the second tubular member 14 made, the elastomeric seals on the tool are de-energised so that they come away from the surface 20. The tool can then be removed from the tubular members 12,14.

Figure 1A:
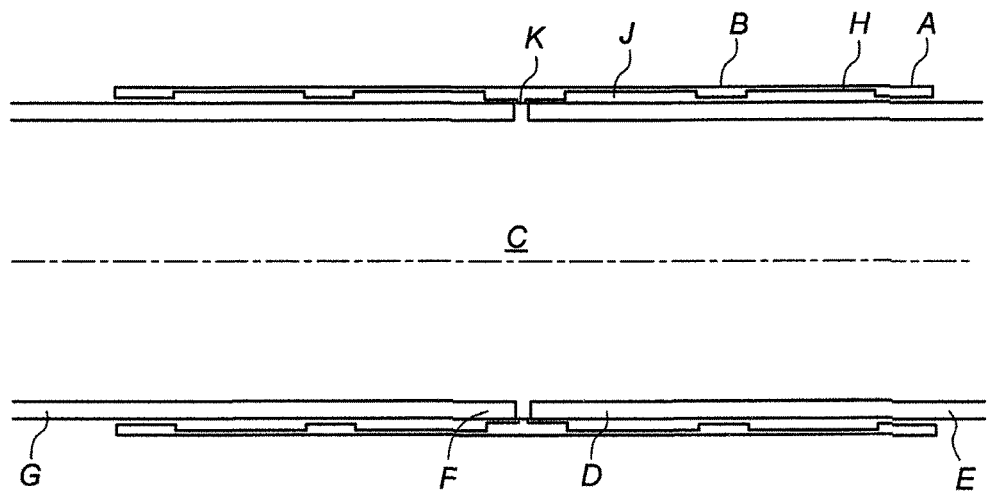
Figure 1B:
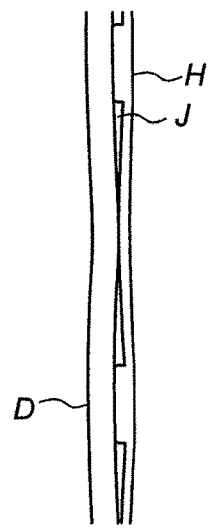

As the first tubular member 12 is tapered, the thinner wall at the first end 28 is more easily morphed into the grooves 52 as less pressure/force is required to create the metal to metal seal, than the arrangement shown as prior art in FIG. 1. Consequently, the width of the grooves can be reduced, which means that the profiled sections 46,50 can be reduced in length. This advantageously reduces the length of overlap of the ends 28,42 required at the coupling 10.

As described hereinbefore, in the embodiment shown in FIG. 2, the second tubular member 14 is a connector 16. The tubular connector 16 is a metal sleeve having a substantially cylindrical body 56 with a bore 58 therethough providing an inner surface 34 and an outer surface 38. The connector 16 has a first end 28 described herein before with a profiled section 50 on the inner surface 34. The connector 16 has a second end 60 which is identical to the first end 28.

The inner surface 34 includes a ledge 62 which protrudes into the bore 58 between a first end 28 and a second end 60 of the connector 16. Ledge 62 extends circumferentially around the inner surface 34 providing oppositely directed first 64 and second 66 annular surfaces. In a preferred embodiment, the dimensions of the first 64 and second 66 annular surfaces matches the dimensions of the end face 30 of the first tubular member 12. In this way, the annular surfaces 64,66 can be considered as abutting faces for assisting in positioning the first 12 and a third tubular member 68 within the connector 16.

The third tubular member 68 is as described for the first tubular member 12. In this way, FIG. 2 illustrates a dual coupling system for connecting a first 12 and a third 68 tubular together via a second tubular member 16. The second tubular 14 can advantageously be of a shorter length than the first and third so that it is easier to machine the profiled sections 50 on the inner surface 34 thereof. The connector 16 may also be formed of a different material to the first and third tubular members 12,68 which can resist the outwardly applied radial force better than the material of the first and third tubular members 12,68.

It will, however, be readily appreciated that the second tubular member 14 could of the material and length of the third tubular member 68, negating the requirement for there to be a connector 16 as the coupling system 10 is then directly between the tubular members which require to be joined without any intermediary couplings or fittings.

Figure 3:
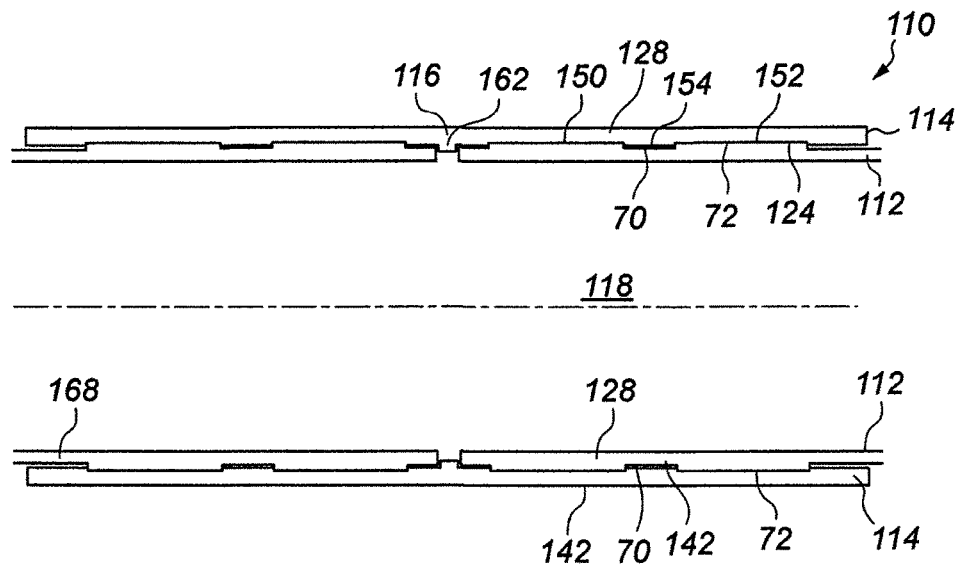
FIG. 3 is a schematic illustration of a coupling system between tubular members according to a second embodiment of the present invention.

Reference is now made to FIG. 3 of the drawings which illustrates a coupling system, generally indicated by reference numeral 110, providing a connection between a first tubular member 112 and a second tubular member 114 according to a second embodiment of the present invention. Like parts to those of FIG. 2 have been given the same reference numeral with the addition of '100' to aid clarity.

FIG. 3 shows a coupling 110 between a first tubular member 112 and a second tubular member 114 in a similar arrangement to FIG. 2, wherein the second tubular member 14 is a connector 16, which is in turn connected to a third tubular member 168 to provide a dual coupling. Like the arrangement of FIG. 2, this could be provided as a single coupling between two similar tubular members which have the respective ends 128 and 142 for mating together.

In the embodiment of FIG. 3, the profiled section 150 of the second tubular member 14 is provided with grooves 152 having rims 154 there between. There is no tapering present and the inner surface 134 has a substantially uniform diameter. Note that the depths of the grooves 152 and the respective heights of the rims 154 are small in relation to the thickness of the wall of the second tubular member 14. This is done to provide maximum strength at the end 128. The profiled section 146 of the first tubular member 112 is also provided with grooves 70 having rims 72 there between. However the grooves 70 and rims 72 are the inverse of the grooves 152 and rims 154. In this way, the rims 72, 154 lie within the opposing grooves 154, 70, respectively when the first ends 128, 142 are arranged coaxially together. As with the second tubular member 14, no tapering is present and the inner surface 120 has a uniform diameter. While no tapering is illustrated, it will be appreciated that tapering of the ends may be done.

If the connector 116 is used, the ledge 162 has a height greater than the depth of the grooves 152,70 but less than the thickness of the first tubular member 112.

The diameter at the inner surface 134 of the second tubular member 114 is greater than the diameter at the outer surface 124 of the first tubular member 112 at the end 128. This allows the first end 128 of the first tubular member 112 to be slid inside the first end 142 of the second tubular member 114 and for the profiled sections 150,152 to be coaxially aligned. If the connector 116 is used then the first tubular member 112 can be inserted until the end face 130 abuts the second surface 166 of the ledge 162.

Once positioned, a force can be applied to the ends 128,142. In this embodiment, the force may be applied radially inwardly or outwardly. An outward radial force can be applied as described herein before with reference to FIG. 2. An inward radial force can be applied by use of a hydraulic tool (not shown) which is used to create the metal to metal seal between the ends 128,142 of the tubular members 112,114. The tool is located around the outer surface 138 of the second tubular member 114 at the end 142. Hydraulic fluid is pumped into the tool to cause pistons to move radially inwardly. The pistons are ideally arranged to provide a force equally against an entire circumference of the outer surface 138 of the second tubular member 114. The force of the pistons against the outer surface 138 causes the end 142 of the second tubular member 114 to also move radially inwards at the location of the pistons. The pistons are positioned relative to the rims 154 to cause the second tubular member 114 to preferentially collapse and contract around the outer surface 124 of the first tubular 112. The profiled section 150 is therefore pressed into the profiled section 146 with the respective rims 72, 154 lie and opposing grooves 154, 70 mating to create a metal to metal seal between the first and second tubular members 112,114. Those skilled in the art will recognise that other hydraulically operated tools could be used to provide a radial force to achieve a metal to metal seal. Preferably the tool will provide equal pressure around the ends 128,142 such as may be found with a rotational crimping tool or swage device.

An alternative tool for creating the force may be a cone as is known in the art. The cone is fitted around the outer surface 138 of the second tubular member 114 adjacent the end 142. As described before, the end 142 has a greater diameter than the rest of the tubular member 114 so that as the cone is driven over the end 142, it forces the end 142 radially inwardly and the metal to metal seal is provided between the profiled sections 146,150. Preferably the outer diameter of the end 142 is sized such that after the cone has passed over, the diameter is uniform with the rest of the tubular member 114. Thus the increased diameter should be equal to or greater than the depth/height of the grooves 154, 70 and rims 72, 154 so that an effective seal is made. If desired the solid cone can be used in combination with fluid pressure.

The advantage of the second embodiment is that it does not rely on the pipe wall morphing into a groove. This embodiment would benefit from having a compliant sealing material located on the grooves prior to application of the force.

Referring to FIG. 4 of the drawings there is illustrated a coupling system, generally indicated by reference numeral 210, providing a connection between a first tubular member 212 and a second tubular member 214 according to a third embodiment of the present invention. Like parts to those of FIG. 2 have been given the same reference numeral with the addition of '200' to aid clarity.

Like FIG. 3, the profiled sections 246,250 provide an inverse groove arrangement between the first 212 and second 214 tubulars. In this arrangement, the grooves 252,270 and rims 254,272 are of a comparable size so that the coupling 210 resembles a series of meshed teeth. The size of the grooves 252,270 and rims 254,272 can be comparable to the screw thread currently used remembering that in this invention they are a series of separate parallel grooves in contrast to the single groove helical arrangement in a screw thread. The rims 254,272 are trapezoid in cross-section, with the grooves 252,270 providing a slightly smaller mirror image to give an interference fit when brought together. When the force is applied the metal to metal seal is created at the angled sides 74,76 of the rims 254,272. It will be appreciated that the grooves/rims can be of any complementary shape, for example trapezoidal or triangular. Equally the sides need not be straight, they may be curved or have any profile which increases the potential surface area or number of points of contact to make a seal.

Referring to FIG. 5 there is illustrated a coupling system, generally indicated by reference numeral 310, providing a connection between a first tubular member 312 and a second tubular member 314 according to a fourth embodiment of the present invention. Like parts to those of FIG. 2 have been given the same reference numeral with the addition of '300' to aid clarity.

In this arrangement, the grooves 352,370 and rims 354, 372 of FIG. 4 are now located on a taper as described with reference to FIG. 2. This provides a sawtooth arrangement. At the first end 328 of the first tubular member 312, there is provided a profiled section 346. The profiled section 346 is tapered so that the thickness of the wall of the tubular member 312 reduces towards a distal end to provide an annular end face 330. On the tapered outer surface 324 there are arranged a parallel series of grooves 370. Each groove 370 has a tapered base 78 with sloping side walls 374,376. The side wall 374 closer to the end face 330 is sloped at an angle which is closer to perpendicular to the bore 318 than the side wall 376. This assists in loading when the coupling 310 is made up. Between each groove 370 there is provided a rim 372. The side walls 374,376 match those of the grooves bounding the rim 372. The rim 372 is trapezoidal in shape so that its top 80 is substantially parallel to the bore 318. It will be appreciated that the grooves/rims can be of any complementary shape, for example trapezoidal or triangular. Equally the sides need not be straight, they may be curved or have any profile which increases the potential surface area or number of points of contact to make a seal.

The corollary is provided at the first end 342 of the second tubular member 314. The profiled section 350 is tapered so that the thickness of the wall of the tubular member 314 reduces towards a distal end to provide an annular end face 344. On the tapered outer surface 338 there are arranged a parallel series of grooves 350. Between each groove 350 there is provided a rim 354. Contrary to the first tubular member 312, each rim 354 has a tapered top 80 with sloping side walls 374,376. The side wall 374 furthest from the end face 344 is sloped at an angle which is closer to perpendicular to the bore 318 than the side wall 376. The side walls 374,376 match those of the grooves bounding the rim 372. The groove 350 is trapezoidal in shape so that its base 78 is substantially parallel to the bore 318.

A side view of the first tubular member 312 is shown in FIG. 6. It can be seen that the second groove 82 from the end face 330 has an increased slope on the taper. This provides a pilot end to the member 312 and an increased surface area over which contact can be made at a point on the first end 328 where the wall will be particularly thin. The arrangement of parallel grooves 370, being perpendicular to the bore 318 and providing a continuous circumferential profile on the outer surface 324, can be clearly seen. This is in direct contrast to the screw thread arrangement which would provide a single groove helically wound on the outer surface.

The coupling 310 is made up by inserting the first end 328 of the first tubular member 312 into the first end 342 of the second tubular member 314 until the respective grooves and rims are coaxially aligned with the end face 330 aligning with an end stop 84 on the second tubular member 314. Radial force can be applied to the inner surface 320 of the first tubular member 312, the outer surface 338 of the second tubular member 314 or both, to cause the ends 328, 342 to be brought together and each rim 354,372 to be forced into the corresponding groove 370,352. The contact between a rim 372 and a groove 352 is shown in FIG. 7 where the rim 372 has made an interference fit within the groove 352 and the side walls 374,376 are in contact to provide a metal to metal seal. This produces a very high contact pressure which elastically deforms both the first 312 and second 314 tubular members at the contact point. Pressure can be applied to plastically deform the member exposed to the radial force while the opposite member will elastically contract and tighten the seal by placing tension on the member when the pressure is released.

Figure 8:
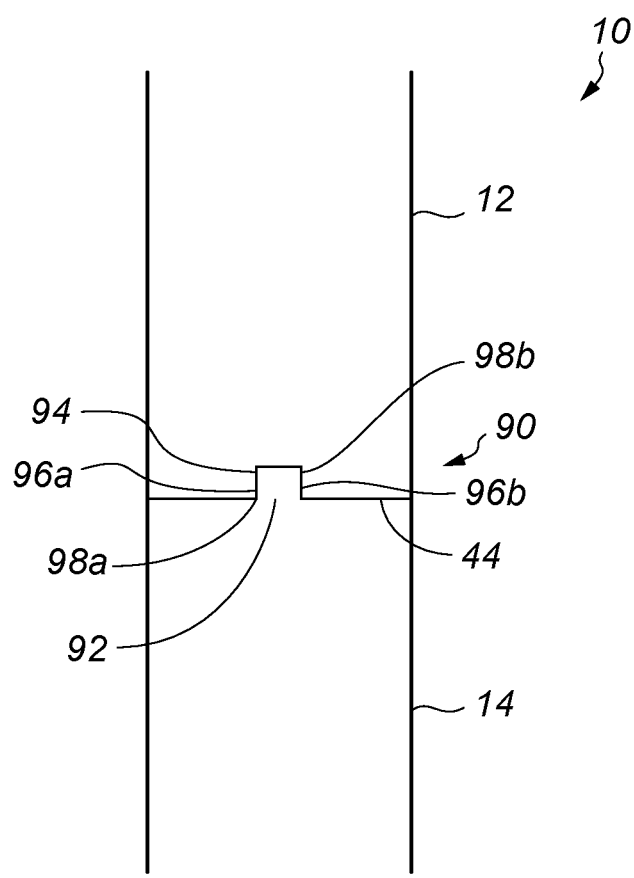
FIG. 8 is a schematic illustration of an anti-rotation fitting in a coupling system according to a further embodiment of the present invention.

Reference is now made to FIG. 8 of the drawings which illustrates an anti-rotation fitting, generally indicated by reference numeral 90, for use in a coupling system 10,110, 210,310 according to an embodiment of the present invention. The fitting 90 will be described with reference to the coupling system 10, but finds equal applicability to all coupling systems.

Fitting 90 comprises a lug 92 located on the end face 44 of the second tubular member 14 which is located within a recess 94 machined in the end face 30 of the first tubular member 12. Lug 92 provides first 96a and second 96b surfaces which are not parallel to the end faces 30,44 and each does not extend circumferentially around the tubular member 14. Similarly, the recess 94 provides first 98a and second 98b abutting surfaces for contact with the first 96a and second 96b surfaces respectively. First 98a and second 98b abutting surfaces do not extend circumferentially around the tubular member. In the embodiment shown the surfaces 96,98 are perpendicular to the end faces 30,44. The fitting 90 prevents the tubular member 12,14 rotating with respect to the other tubular member 14,12 at the coupling 10.

The principle advantage of the present invention is that it provides a coupling system for connecting two tubular members with a metal to metal seal between the members without requiring a screw thread.

A further advantage of the present invention is that it provides a coupling system for connecting two tubular members which does not require an intermediary fitting or adaptor to be connected to each tubular member.

A yet further advantage of at least one embodiment of the present invention is that it provides a coupling system for connecting two tubular members which prevents relative rotation of the tubular members when joined together.

It will be appreciated by those skilled in the art that modifications may be made to the invention herein described without departing from the scope thereof. For example, while the tubular members have been described as metal structures, only the end portions need to have metal to form the seal and thus the tubular members may be of composite form with metal ends. While a single lug is described as being located on the second tubular member, any number of lugs may be used and the one or more lugs can be located on the first tubular member. Additionally the lug may take any shape provided it has the required surface for preventing rotation.

We claim:

1. A non-threaded coupling system between first and second tubular members comprising:
    a first tubular member having a first end with an inner surface and an outer surface, a first profiled section extending circumferentially and continuously around the outer surface and the inner surface being co-linear with a central axis of the coupling system;
    a second tubular member having a first end with an inner surface and an outer surface, a second profiled section extending circumferentially and continuously around the inner surface, the outer surface being co-linear with a central axis of the coupling system;
    the first end of the first tubular member being inserted within the first end of the second tubular member so that the profiled sections are coaxial and by application of a force applied radially inwards on a surface opposite a profiled section in a direction orthogonal to the central axis, creating a metal to metal seal between the tubular members at the profiled sections.

2. A non-threaded coupling system according to claim 1 wherein the first and second tubular members have the same outer diameter and inner diameter.

3. A non-threaded coupling system according to claim 1 wherein the first profiled section comprises one or more circumferential grooves formed on the outer surface of the first end.

4. A non-threaded coupling system according to claim 3 wherein the first profiled section comprises a plurality of circumferential grooves formed on the outer surface of the first end and a continuous annular rim is formed between each pair of grooves.

5. A non-threaded coupling system according to claim 4 wherein grooves are formed on the first and second profiled sections and each groove on the first and second profiled section is arranged to mate with a rim on the opposing second and first profiled section, respectively.

6. A non-threaded coupling system according to claim 1 wherein the second profiled section comprises one or more circumferential grooves formed on the inner surface of the first end.

7. A non-threaded coupling system according to any claim 1 wherein the first profiled section is a reverse of the second profiled section so that the sections perfectly mate causing an interference fit when the force is applied.

8. A non-threaded coupling system according to any claim 1 wherein the first profiled section is tapered.

9. A non-threaded coupling system according to claim 1 wherein the second profiled section is tapered.

10. A non-threaded coupling system according to claim 1 wherein the first tubular member includes a third profiled section at an end face and the second tubular member includes a fourth profiled section at an end face wherein the third and fourth profiled sections mate to prevent relative rotation of the tubular members.

11. A non-threaded coupling system according to claim 10 wherein the third profiled section comprises at least one lug on the end face and the fourth profiled section comprises at least one notch, each notch being sized to receive a lug when the force is applied.

12. A non-threaded coupling system according to claim 10 wherein the fourth profiled section comprises at least one lug on the end surface and the third profiled section comprises at least one notch.

13. A non-threaded coupling system according to claim 1 wherein the second tubular member is a connector.

\* \* \* \* \*